(12) United States Patent
Reinertson et al.

(10) Patent No.: US 11,778,998 B2
(45) Date of Patent: Oct. 10, 2023

(54) FISHING REEL AND ARM SYSTEM

(71) Applicant: ReelistCo LLC, Victoria, MN (US)

(72) Inventors: Matt Reinertson, Victoria, MN (US); Steve Turnbull, Hugo, MN (US)

( * ) Notice: Subject to any disclaimer, the term of this patent is extended or adjusted under 35 U.S.C. 154(b) by 0 days.

(21) Appl. No.: 17/692,518

(22) Filed: Mar. 11, 2022

(65) Prior Publication Data
US 2022/0295772 A1    Sep. 22, 2022

Related U.S. Application Data

(60) Provisional application No. 63/159,515, filed on Mar. 11, 2021.

(51) Int. Cl.
| | | |
|---|---|---|
| *A01K 89/01* | (2006.01) | |
| *A01K 89/033* | (2006.01) | |
| *A01K 89/08* | (2006.01) | |
| *A01K 97/01* | (2006.01) | |
| *B65H 75/44* | (2006.01) | |

(52) U.S. Cl.
CPC ............ *A01K 89/046* (2015.05); *A01K 89/08* (2013.01); *A01K 97/01* (2013.01); *B65H 75/4444* (2013.01)

(58) Field of Classification Search
None
See application file for complete search history.

(56) References Cited

U.S. PATENT DOCUMENTS

| | | | | | |
|---|---|---|---|---|---|
| 371,777 | A | * | 10/1887 | McCabe | A01K 91/10 242/253 |
| 2,904,272 | A | * | 9/1959 | Barrett | F16C 1/18 242/390.1 |
| 4,215,503 | A | * | 8/1980 | Hiner | A01K 97/11 43/15 |
| 4,373,287 | A | * | 2/1983 | Grahl | A01K 97/01 43/17 |
| 5,199,206 | A | * | 4/1993 | Richardson | A01K 91/06 43/18.1 R |
| 5,873,191 | A | * | 2/1999 | Bova | A01K 97/11 43/15 |
| 10,631,530 | B1 | * | 4/2020 | Peterman | A01K 97/01 |
| 11,191,259 | B1 | * | 12/2021 | Nevius | A41D 19/0041 |
| 2013/0255130 | A1 | * | 10/2013 | Baugh | A01K 97/12 43/4.5 |

* cited by examiner

*Primary Examiner* — Emmanuel M Marcelo
(74) *Attorney, Agent, or Firm* — Fredrikson & Byron, P.A.

(57) ABSTRACT

Fishing reel system embodiments herein include an extendable arm assembly and a reel assembly rotatably attached thereto. Certain reel assembly embodiments include an adjustable drag washer stack that can be adjustably compressed to adjust the amount of friction within the washer stack. Other implementations include solely a reel assembly with such an adjustable drag washer stack.

20 Claims, 7 Drawing Sheets

FISHING REEL AND ARM SYSTEM

CROSS-REFERENCE TO RELATED APPLICATION(S)

This application claims the benefit under 35 U.S.C. § 119(e) to U.S. Provisional Application 63/159,515, filed Mar. 11, 2021 and entitled "Fishing Reel and Arm System," which is hereby incorporated herein by reference in its entirety.

FIELD

The various embodiments herein relate to fishing equipment, especially fishing reel assemblies, and even more specifically to rattle reel assemblies.

BACKGROUND

A rattle reel is a specialized fishing reel system used mainly for ice fishing. More specifically, known rattle reel systems typically involve a reel, an audible alert mechanism (such as a bell or a rattle of some kind) for notifying the user of reel rotation (when a fish bites the bait and pulls on the fishing line, thereby causing rotation of the reel), and an attachment structure for providing attachment of the reel to a structure such as the side of a wheelhouse, ice shanty, or even a bucket. Generally, the reel system is used to suspend bait in the water.

Known rattle reel designs have disadvantages. More specifically, such known reels generally use various attachment structures that are non-adjustable and awkward. Further, most known rattle reels don't provide for micro-adjustable drag mechanisms. That is, most known rattle reels allow for only large drag or tension adjustments that result in large changes in the amount of drag being applied to the reel.

There is a need in the art for an improved rattle reel system.

BRIEF SUMMARY

Discussed herein are various reel assemblies that include both an extendable arm and a rattle reel attached thereto. Alternative embodiments can include a rattle reel assembly without the extendable arm.

In Example 1, a fishing reel system comprises an arm assembly and a reel assembly. The arm assembly comprises an elongate arm body, an elongate extendable arm body slidably disposed within the elongate arm body, a two-way joint disposed at a proximal end of the elongate arm body, and an attachment mechanism coupled to the two-way joint. The reel assembly comprises a spool body rotatably coupled to the elongate extendable arm body, wherein the spool body is configured to receive fishing line wrapped around the spool body, a drag washer stack operably coupled to the spool body such that compression of the drag washer stack adjustably creates a desired amount of drag in rotation of the spool body, and a drag adjustment mechanism operably coupled to the drag washer stack, wherein adjustment of the drag adjustment mechanism causes adjustment in the compression of the drag washer stack, thereby causing adjustment of the drag in the rotation of the spool body.

Example 2 relates to the fishing reel system according to Example 1, wherein the two-way joint allows vertical and horizontal rotation, whereby the elongate arm body is moveable vertically and horizontally in relation to the attachment mechanism.

Example 3 relates to the fishing reel system according to Example 1, wherein the attachment mechanism is configured to attach to a wall or other stationary object.

Example 4 relates to the fishing reel system according to Example 1, further comprising an elongate shaft extending from the elongate extendable arm body, wherein the spool body is rotatably disposed over the elongate shaft.

Example 5 relates to the fishing reel system according to Example 4, wherein the drag washer stack comprises at least two washers disposed on the elongate shaft.

Example 6 relates to the fishing reel system according to Example 1, wherein the drag washer stack comprises at least one fabric washer and at least one metal washer.

In Example 7, a fishing reel system comprises an arm assembly and a reel assembly. The arm assembly comprises an elongate arm body, an elongate extendable arm body slidably disposed within the elongate arm body, a two-way joint disposed at a proximal end of the elongate arm body, an attachment mechanism coupled to the two-way joint, and an elongate shaft extending from the elongate extendable arm body. The reel assembly comprises a spool body rotatably disposed on the elongate shaft, wherein the spool body is configured to receive fishing line wrapped around the spool body, a drag washer stack operably coupled to the spool body such that compression of the drag washer stack adjustably creates a desired amount of drag in rotation of the spool body, the drag washer stack comprising at least two washers disposed on the elongate shaft, and a drag adjustment mechanism operably coupled to the drag washer stack, wherein adjustment of the drag adjustment mechanism causes adjustment in the compression of the drag washer stack, thereby causing adjustment of the drag in the rotation of the spool body.

Example 8 relates to the fishing reel system according to Example 7, wherein the spool body comprises a stack cavity defined within the spool body, wherein the drag washer stack is disposed within the stack cavity.

Example 9 relates to the fishing reel system according to Example 8, wherein the stack cavity comprises at least one notch defined in an inner wall of the stack cavity.

Example 10 relates to the fishing reel system according to Example 9, wherein a first washer of the at least two washers comprises a tab extending from the first washer, wherein the tab is mateable with the at least one notch.

Example 11 relates to the fishing reel system according to Example 7, wherein the at least two washers comprises at least one fabric washer and at least one metal washer.

Example 12 relates to the fishing reel system according to Example 7, wherein the at least two washers comprise at least one fabric washer, at least one metal washer, and a tabbed washer comprising a tab extending from the tabbed washer.

Example 13 relates to the fishing reel system according to Example 7, wherein the at least two washers comprise at least two fabric washers, at least two metal washers, and a tabbed washer comprising a tab extending from the tabbed washer.

In Example 14, a fishing reel system comprises an arm assembly and a reel assembly. The arm assembly comprises an elongate arm body, an elongate extendable arm body slidably disposed within the elongate arm body, a two-way joint disposed at a proximal end of the elongate arm body, at least one attachment mechanism couplable to the two-way joint, and an elongate shaft extending from the elongate extendable arm body. The reel assembly comprises a spool body, a drag washer stack, and a drag adjustment mechanism. The spool body comprises a lumen defined within the spool body, wherein the lumen extends from a first side to a second side of the spool body, wherein the elongate shaft is disposed within the lumen, and a stack cavity defined within the first side of the spool body, wherein the spool body is configured to receive fishing line wrapped around the spool body. The drag washer stack is disposed within the stack cavity such that compression of the drag washer stack adjustably creates a desired amount of drag in rotation of the spool body, the drag washer stack comprising at least one fabric washer and at least one metal washer disposed on the elongate shaft. The drag adjustment mechanism is disposed on the first side of the spool body, wherein adjustment of the drag adjustment mechanism causes adjustment in the compression of the drag washer stack, thereby causing adjustment of the drag in the rotation of the spool body.

Example 15 relates to the fishing reel system according to Example 14, wherein the stack cavity comprises at least one notch defined in an inner wall of the stack cavity.

Example 16 relates to the fishing reel system according to Example 15, wherein the drag washer stack further comprises a tabbed washer disposed on the elongate shaft, wherein the tabbed washer comprises a tab extending from the tabbed washer, wherein the tab is mateable with the at least one notch.

Example 17 relates to the fishing reel system according to Example 16, wherein the at least one fabric washer comprises at least two fabric washers, and wherein the at least one metal washer comprises at least two metal washers.

Example 18 relates to the fishing reel system according to Example 17, wherein each of the at least two fabric washers, the at least two metal washers, and the tabbed washer comprises a central opening defined therein, wherein the elongate shaft is disposed through the central opening.

Example 19 relates to the fishing reel system according to Example 14, wherein the drag adjustment mechanism is operably coupled to the elongate shaft.

Example 20 relates to the fishing reel system according to Example 19, wherein rotation of the drag adjustment mechanism in a clockwise direction increases friction between the at least one fabric washer and the at least one metal washer.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

DETAILED DESCRIPTION

The various reel system embodiments herein have a reel (or "reel assembly"), a rotation indicator, an attachment arm, and a drag mechanism. In certain implementations, the attachment arm can allow the reel to move—and thus be positioned—180 degrees vertically and horizontally, and can be locked into any position within those ranges. In further embodiments, the attachment arm can be extendable such that the arm is adjustable to increase or decrease overall length of the arm. Thus, the lockable adjustability and extendibility allows the arm to be mounted in more locations near the target water or ice hole and to be adjusted and then locked into the optimal position. In addition, according to certain implementations, the drag system creates a more robust process of tuning the drag force with micro adjustments that allow the user more room for error when balancing the drag force, thereby making it easier to set the drag setting of the mechanism. The drag mechanism, in accordance with various embodiments herein, can make balancing the system easier and allows an operator more room for error when tuning the drag. In certain specific implementations, the mechanism allows the reel to have enough drag to keep the bait in position, but limit the amount of resistance the fish feels when it takes the bait.

The various device embodiments disclosed herein can be used to fish in any manner, specifically, but not limited to ice fishing.

Figure 1:
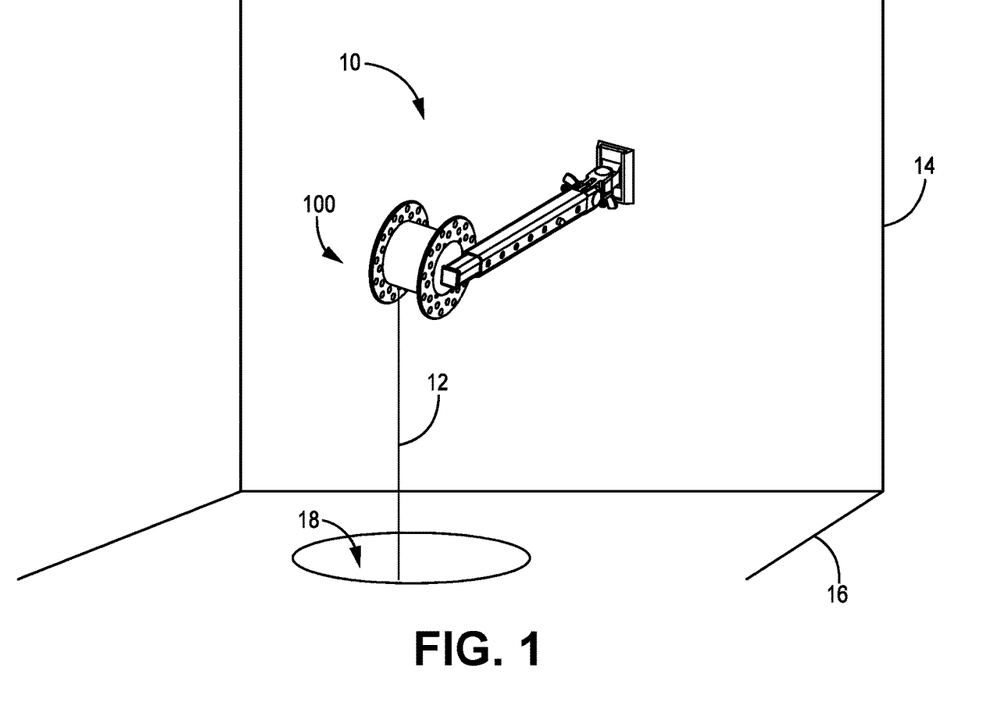
FIG. 1 demonstrates how the device would be mounted and used in relation to a wall, floor, and ice hole.

FIG. 1 depicts one implementation of a rattle reel system 10 mounted on a wall 14 in relation to the floor 16 so that the fishing line 12 is positioned in the center of the ice hole 18. This figure illustrates a simplified setting of a typical ice house; however, surface and hole locations vary, and the various embodiments herein can be attached to any number of different types of structures.

Figure 2A:
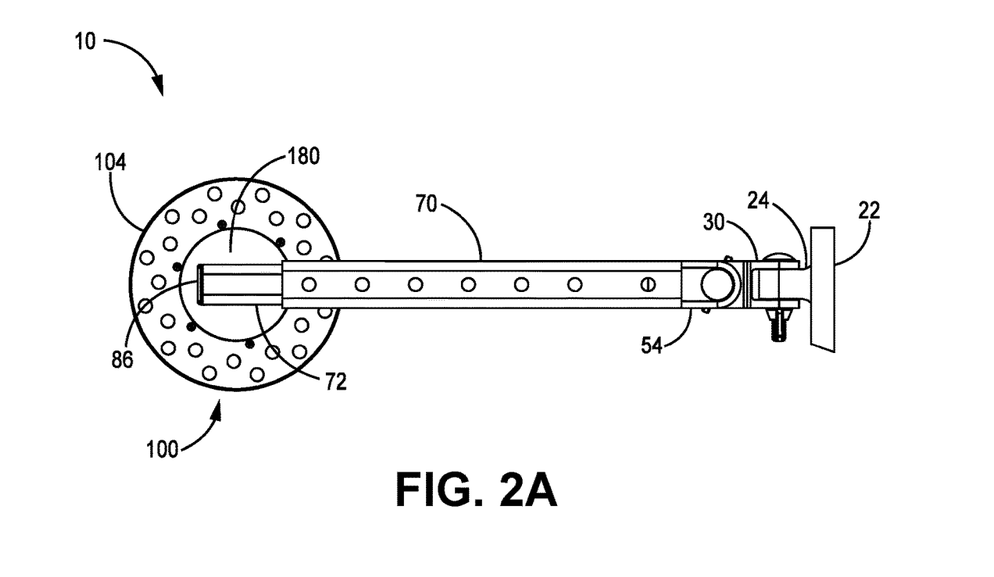
FIG. 2A is a view of the device from the left side.

FIG. 2A depicts a side view of the rattle reel system 10, according to one embodiment. The details of the various components of the system 10 are discussed in additional detail below in relation to the description for FIG. 3B.

Figure 2B:
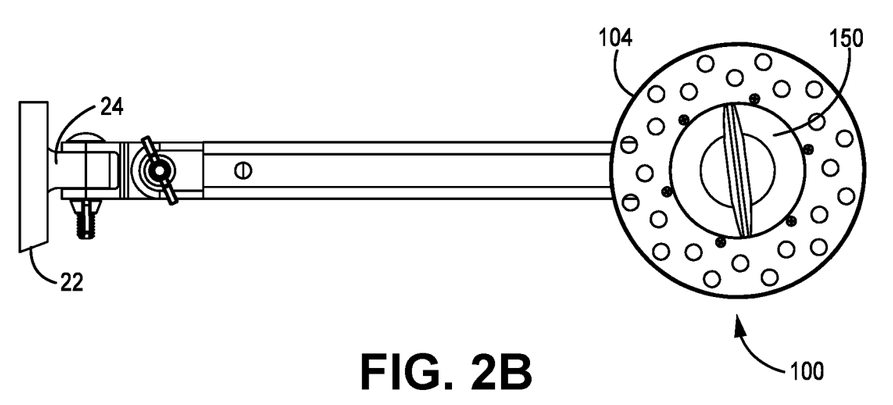
FIG. 2B is a view of the device from the right side.

FIG. 2B illustrates another side view (from the opposing side in contrast to FIG. 2A) of the system 10. As shown, the system 10 has a drag knob 150 disposed as shown in relation to a spool wall 104.

Figure 3A:
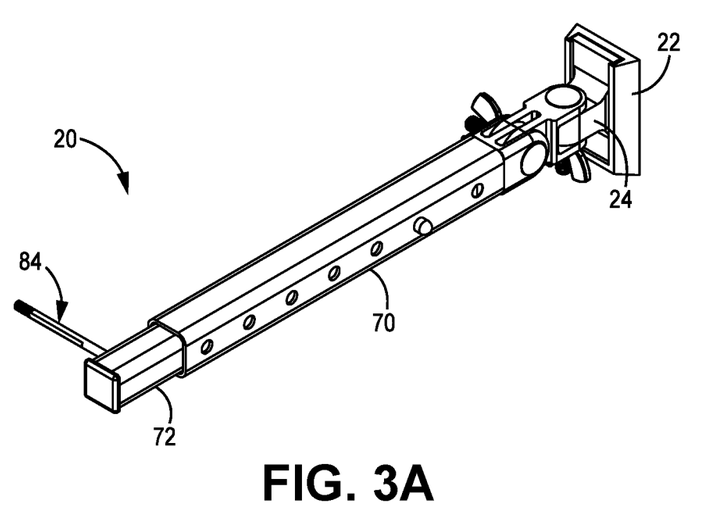
FIG. 3A is a perspective view focusing on the wall mount and arm assembly.

FIG. 3A is a view focusing on the arm assembly 20, according to one exemplary embodiment.

Figure 3B:
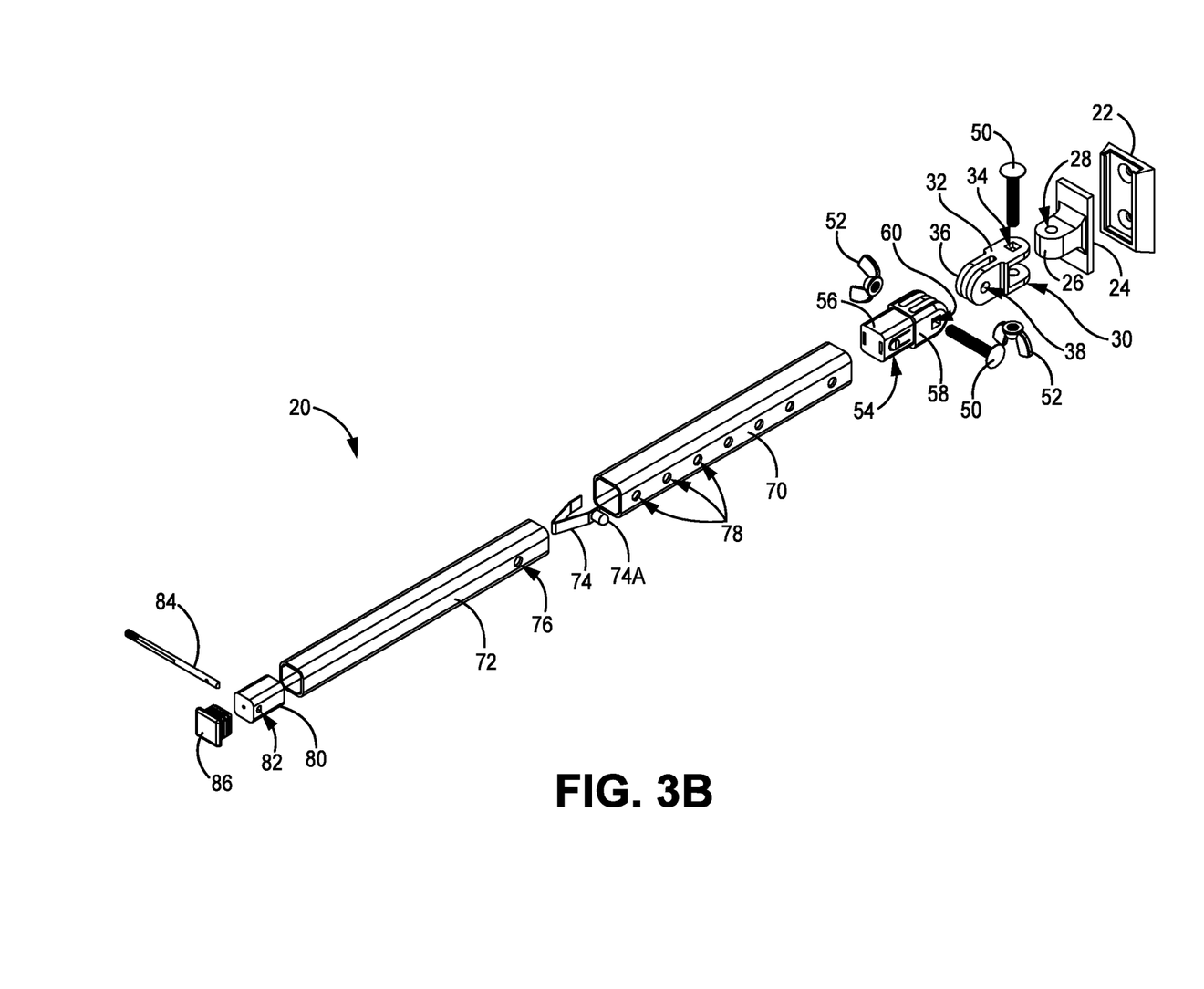
FIG. 3B is an exploded view of FIG. 3A depicting all of the components within the arm assembly.

FIG. 3B is an exploded view of the arm assembly 20 as shown in FIG. 3A, depicting the components within the assembly 20 in further detail. The assembly 20 has a mounting bracket 22 that can be fixed to a wall/surface (such as with two screws). The attachment body 24 can slide into the mounting bracket 22 from the top and be held in place by the side walls and lower support of the mounting bracket 22. These two components allow the user to easily remove the arm assembly 20 from the wall. This can be beneficial during transportation and use. In certain embodiments, two or more brackets 22 can be provided such that the two or more brackets 22 can be attached or otherwise positioned in different locations so the system 10 can easily be moved between the two or more bracket 22 positions.

In certain implementations as shown, the attachment body 24 also has a protrusion 26 with an opening 28 defined thereto, such that a 2-way joint bracket 30 is rotatably coupled with the attachment body 24 via the opening 28 in the protrusion 26. More specifically, in this specific embodiment, the 2-way joint bracket 30 is coupled to the body 24 via a carriage bolt 50 and wing nut 52. The 2-way bracket 30 has two sections: a first section 32 with openings 34 to receive the carriage bolt 50 and a second section 36 with openings 38 defining an axis that is transverse to the axis of the openings 34 of the first section 32. As mentioned above, the 2-way joint bracket 30 is rotatably coupled to the attachment body 24 via the openings 34 of the first section 32 such that the angle of the device can be adjusted on the horizontal plane at this point by rotating the 2-way joint bracket 30 in relation to the attachment body 24 (wherein the rotation occurs about the axis of the first openings 34. The rotatability of the bracket 30 in relation to the body 24 can be adjusted and fixed into the desired position with the carriage bolt 50 and wing nut 52 by tightening or loosening the bolt 50 via the wing nut 52.

Further, the bracket 30 is rotatably coupled with a pivoting insert 54 via the openings 38 in the second section 36. In one embodiment as shown, the insert 54 has an insert body 56 and a bracket section 58, wherein the bracket section 58 has openings 60 defined therein. In this specific embodiment, the 2-way joint bracket 30 is coupled to the pivoting insert 54 with a carriage bolt 50 and wing nut 52, wherein the carriage bolt 50 is positionable through the openings 38 in the second section 36 and further is disposed through the openings 60 in the bracket section 58 of the insert 54. The pivoting insert 54 is rotatably coupled to the 2-way joint bracket 30 such that the angle of the device can be adjusted on the vertical plane at this point by rotating the pivoting insert 54 in relation to the 2-way joint bracket 30 around the axis defined by the second openings 38 (which is transverse to the axis defined by the first openings 34) and the openings 60. The rotatability of the insert 54 in relation to the second section 36 of the joint bracket 30 can be adjusted and fixed into the desired position with the carriage bolt 50 and wing nut 52 by tightening or loosening the bolt 50 via the wing nut 52.

As such, the 2-way joint bracket 30 and the pivoting insert 54 are adjustably lockable via the bolts 50 and wing nuts 52 such that the arm 20 is rotatable up to 180° vertically (via the pivoting insert 54) and up to 180° horizontally (via the 2-way joint 30) and can be locked into any position in either of those ranges by tightening the wing nuts 52.

In this exemplary embodiment, the opposite end of the pivoting insert 54 is the insert body 56 that is positionable into an end of the arm body 70, thereby attaching the arm body 70 to the pivoting insert 54. The arm assembly 20 also has a telescoping body 72 that is slidably disposed within the arm body 70 such that the body 72 can extend out of or into the arm body 70, thereby increasing or decreasing the overall length of the arm assembly 20. The assembly 20 can have an attachment mechanism 74 for adjustably attaching the telescoping body 72 to the arm body 70. As such, once the telescoping body 72 is disposed at the desired location within the arm body 70 such that the telescoping body 72 is extending out of the arm body 70 the desired amount, the attachment mechanism 74 can temporarily lock the telescoping body 72 into that position in relation to the arm body 70.

In one embodiment, the attachment mechanism 74 has a button 74A as shown that is compressible to fit inside the telescoping body 72 and slid into the opening 76 defined in the telescoping body 72. Once the button 74 is positioned in the body 72, it can be depressed by a user to allow for movement of the telescoping body 72 in relation to the arm body 70. More specifically, the arm body 70 has multiple openings 78 defined along the length of the body 70 as shown that are positioned on the body 70 such that they can be disposed adjacent to the opening 76 in the telescoping body 72 depending on the positioning of the telescoping body 72 within the arm body 70. Thus, a user can depress the button 74, adjust the position of the telescoping body 72 within the arm body 70, and allow the button 74 to extend from the desired opening 78 in the arm body 70 to achieve the desired length of the bodies 70, 72.

In certain implementations, the assembly 20 can also have a main shaft mounting block 80 that can be slidably positioned inside the opposite end of the telescoping body 72. According to one embodiment, the block 80 has an opening 82 defined within the block 80 that is sized to receive an elongate body or rod (also referred to as the "main shaft") 84. As will be described in additional detail below, the main shaft 84 is, in certain embodiments, the shaft 84 over which the reel 100 (described in detail below) is disposed. The main shaft mounting block 80 is inserted far enough into the telescoping body 72 so that the hole 82 in the main shaft mounting block 80 lines up with a hole (not shown) defined in the side of the telescoping body 72. In accordance with certain implementations, the main shaft mounting block 80 can be fixed into place within the telescoping body 72 with known fasteners penetrating through the telescoping body 72 and into the main shaft mounting block 80. Alternatively, any attachment mechanism can be used.

When the mounting block 80 is disposed correctly within the telescoping body 72 such that the holes in each are lined up (or other attachment mechanism is in place), as described above, the main shaft 84 can be positioned in the opening 82 defined in the main shaft mounting block 80 through the opening (not shown) defined in the sidewall of the telescoping body 72. In certain implementations, the main shaft 84 has a flat surface defined along a length of the shaft 84 at the distal end of the shaft 84 that matches a flat portion of the opening within the mounting block 80 such that the alignment of the two flat surfaces prevents the main shaft 84 from spinning in relation to the main shaft mounting block 80. In one embodiment, the main shaft 84 can be fixedly attached with a set screw (not shown) so it cannot be removed from the main shaft mounting block 80. Alternatively, any attachment mechanism can be used. In accordance with certain embodiments, a small end cap 86 can be positioned into the opening in the end of the telescoping body 72.

Figure 4A:
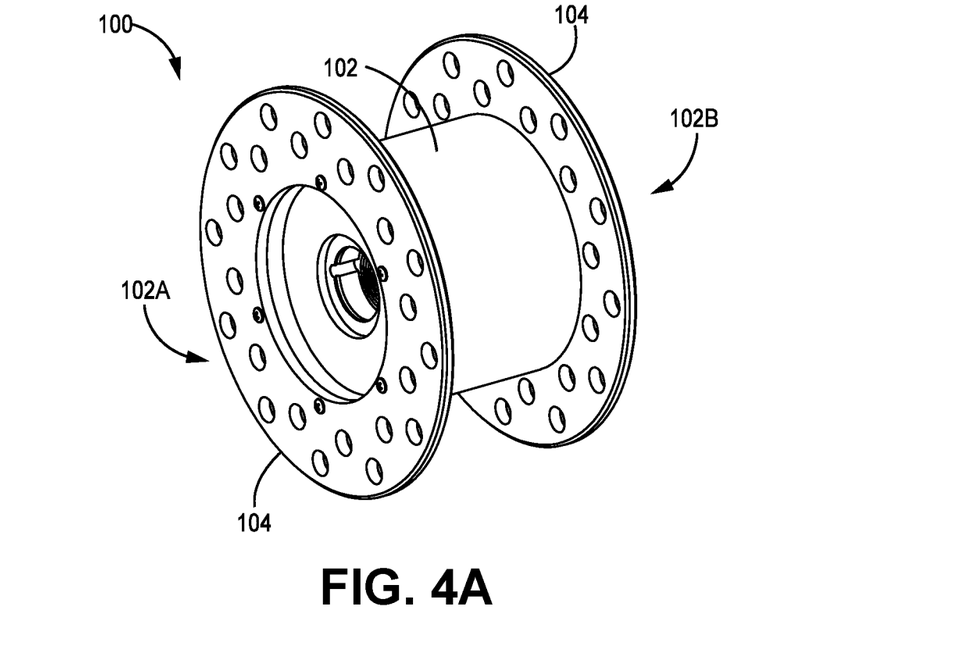
FIG. 4A is a perspective view focusing on the spool assembly.

FIGS. 4A-7 depict various aspects of a reel assembly 100. More specifically, FIG. 4A depicts a reel assembly 100, according to one embodiment. It includes two spool walls 104 mated to the walls of the spool body 102, such as with fasteners. The spool or reel assembly 100 is configured to receive fishing line such that the fishing line is wound around the spool body 102 and bound in place by the spool walls 104.

Figure 4B:
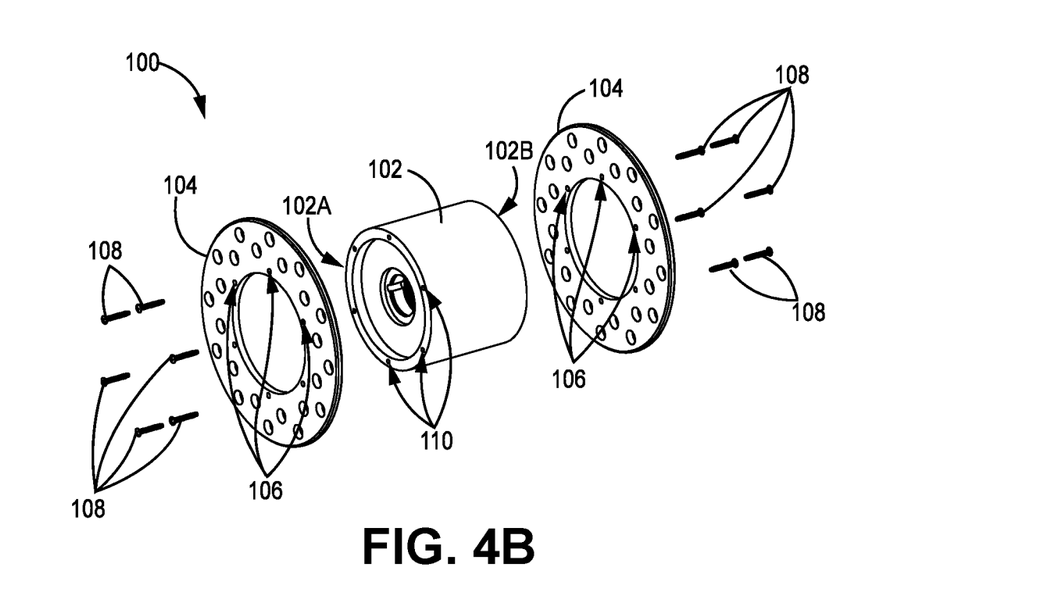
FIG. 4B is an exploded view of FIG. 4A depicting all of the components within the assembly.

FIG. 4B is an exploded view of the spool assembly 100 of FIG. 4A, according to one embodiment. In this implementation, the attachment mechanisms are fastener screws 108 that can be positioned through openings 106 defined in the spool walls 104 that align with the openings 110 in the spool body 102, thereby allowing for attachment of the walls 104 to the body 102.

Figure 5A:
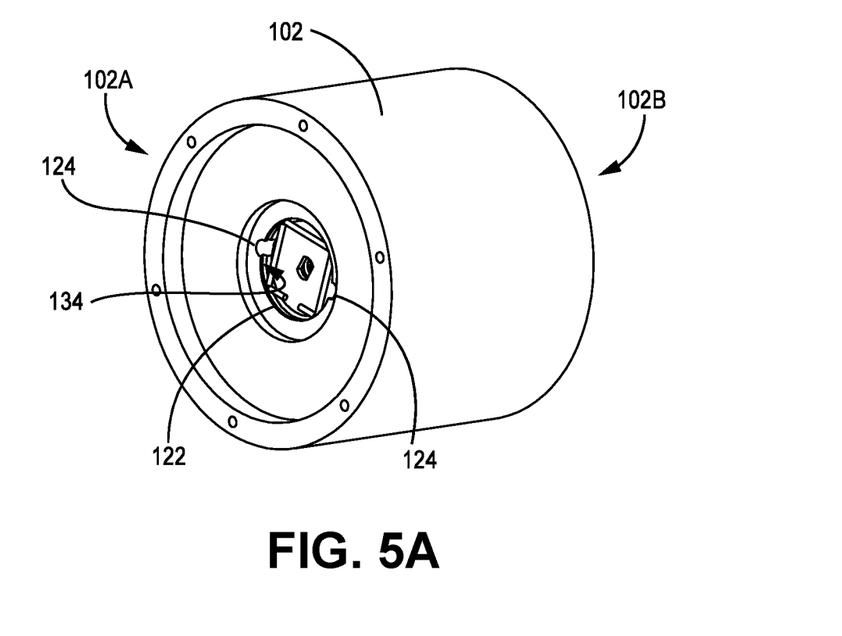
FIG. 5A is a focused perspective view of the drag washer stack within the spool body.
Figure 5B:
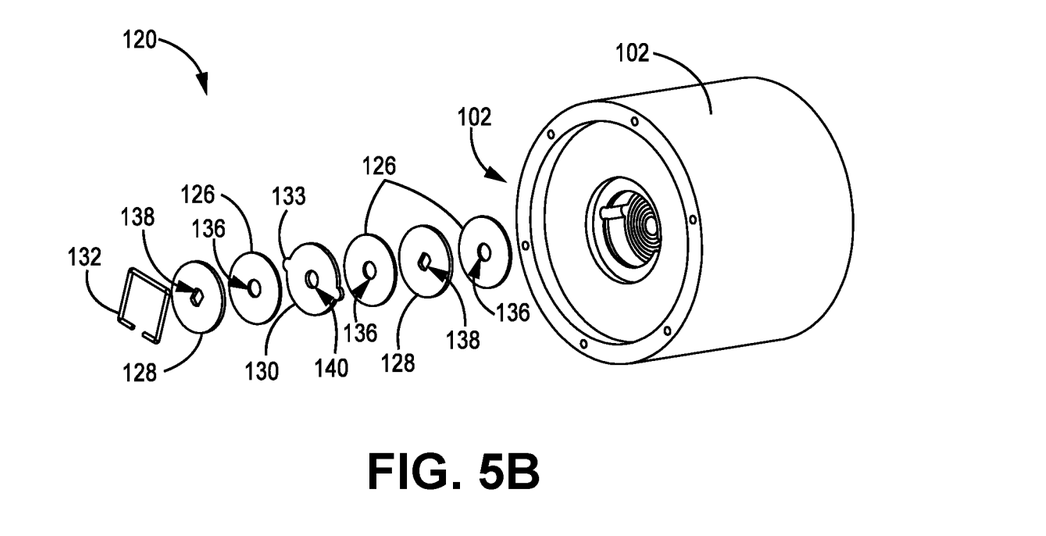
FIG. 5B. is an exploded view of FIG. 5A depicting all of the components of the drag washer stack housed within the drag washer cavity.

FIGS. 5A and 5B depict a more detailed view of the spool body 102, including a drag mechanism (also referred to herein as a "drag washer stack" in certain embodiments) 120 that can be disposed therein, according to one embodiment. More specifically, the spool body 102 in this implementation has a drag mechanism cavity 122 defined in the first side 102A of the body 102 and slots 124 defined in the drag mechanism cavity 122 as shown. According to some implementations, the slots 124 allow the tabs 133 of the tabbed drag washer 130 best shown in FIG. 5B to fit inside and prevent the tabbed drag washer 130 from rotating in relation to the spool body 102. FIG. 5A also illustrates the recessed radial channel 134 cut into the inner wall of the drag mechanism cavity 122. This is where the drag mechanism retainer 132 fits into to fix it in place and retain the drag mechanism 120 within the drag mechanism cavity 122. More specifically, the mechanism retainer 132 is a compressible structure 132 that can be compressed to fit into the channel 134, thereby retaining the drag mechanism 120 within the cavity 122.

FIG. 5B depicts all of the components of the drag mechanism 120 housed within the drag washer cavity 122. In one embodiment, the mechanism 120 includes a set (or "stack") of washers 120 in which the various components of the drag washer stack 120, according to one embodiment, are arranged in the following order starting with the component of the stack 120 closest to the spool body 102 and moving outward towards the drag washer stack retainer 132: a first fabric drag washer 126, a first metal drag washer 128, a second fabric drag washer 126, a tabbed metal drag washer 130, a third fabric drag washer 126, and a second metal drag washer 128, with the drag washer stack retainer 132 disposed adjacent to the second metal drag washer 128. Each fabric drag washer 126 has a round interior hole 136 such that the fabric washers 126 can rotate freely around the main shaft 84 discussed above and within the drag washer cavity 122. Alternatively, the drag mechanism 120 can be any known mechanism for controlling the amount of drag applied to the reel 100.

In accordance with certain implementations, the fabric drag washers 126 can be saturated with a lubricant to provide lubrication to the washer stack 120, thereby facilitating rotation of the various components and reducing damage thereto. In one embodiment, the lubricant can be petroleum grease. Alternatively, the petroleum grease can have PTFE or an equivalent friction modifier incorporated therein. In a further alternative, the lubricant can be an oil. In yet another alternative, the lubricant can be any known lubricant that can operate in a similar fashion. Further, channels (not shown) can be cut into the most interior face of the drag washer cavity 122 on the spool body 102 to collect any excess lubricant.

In the specific embodiment shown, the two metal drag washers 128 have openings 138 defined therein having flat faces formed on opposing walls of the openings 138. The flat faces/walls are configured to mate to the matching profile of the main shaft 84 and prevent rotation of the washers 128 in relation to the main shaft 84. Alternatively, any rotation-preventing features can be used.

The tabbed washer 130 has a round opening 140 and thereby can rotate freely around the main shaft 84 (as a result of the circular opening defined therein), but the two tabs 133 fit into and mate to the slots 124 discussed above and thereby prevent rotation of the washer 130 in relation to the spool body 102.

Alternatively, the drag mechanism 120 can have one metal washer 128, one fabric washer 126, and one tabbed washer 130. In a further alternative, the mechanism 120 can have any number of metal washers 128, fabric washers 126, and tabbed washers 130.

With the drag washer stack 120—as shown in FIG. 5B—oriented in this manner according to one implementation, the effective surface area of the surfaces of the various washers 126, 128, 130 generating drag or rotational resistance is increased. That is, the surface area of each of those washers 126, 128, 130, each in contact with at least one other of the washers 126, 128, 130, results in a total surface area that is significantly greater than any configuration that does not have multiple washers as contemplated herein. Friction to the surfaces can be varied depending on the compressive force applied to the drag washer stack 120. As such, this surface area of the washers 126, 128, 130 and the variation in friction applied thereto provides for the micro-adjustments described herein.

Figure 6A:
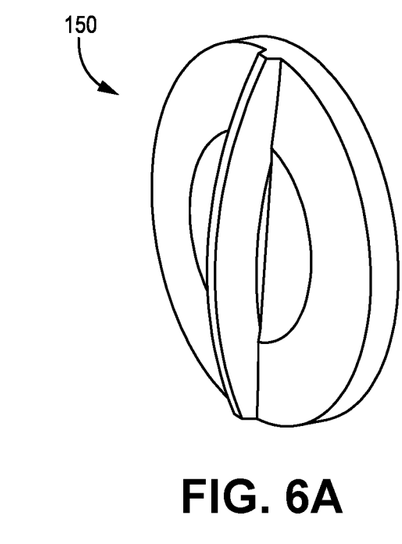
FIG. 6A depicts a front view of the drag knob assembly.
Figure 6B:
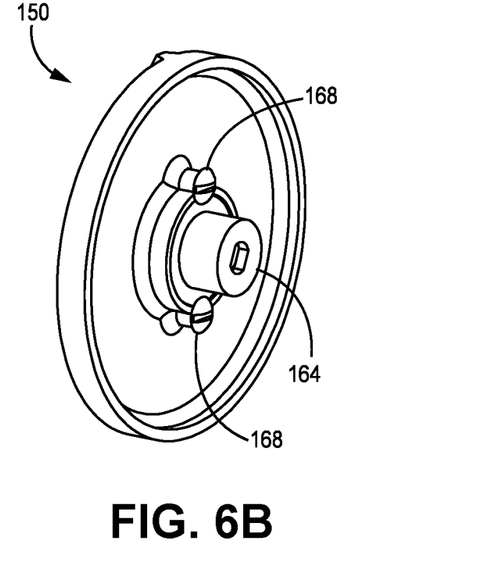
FIG. 6B depicts a back view of the drag knob assembly of FIG. 6A.
Figure 7:
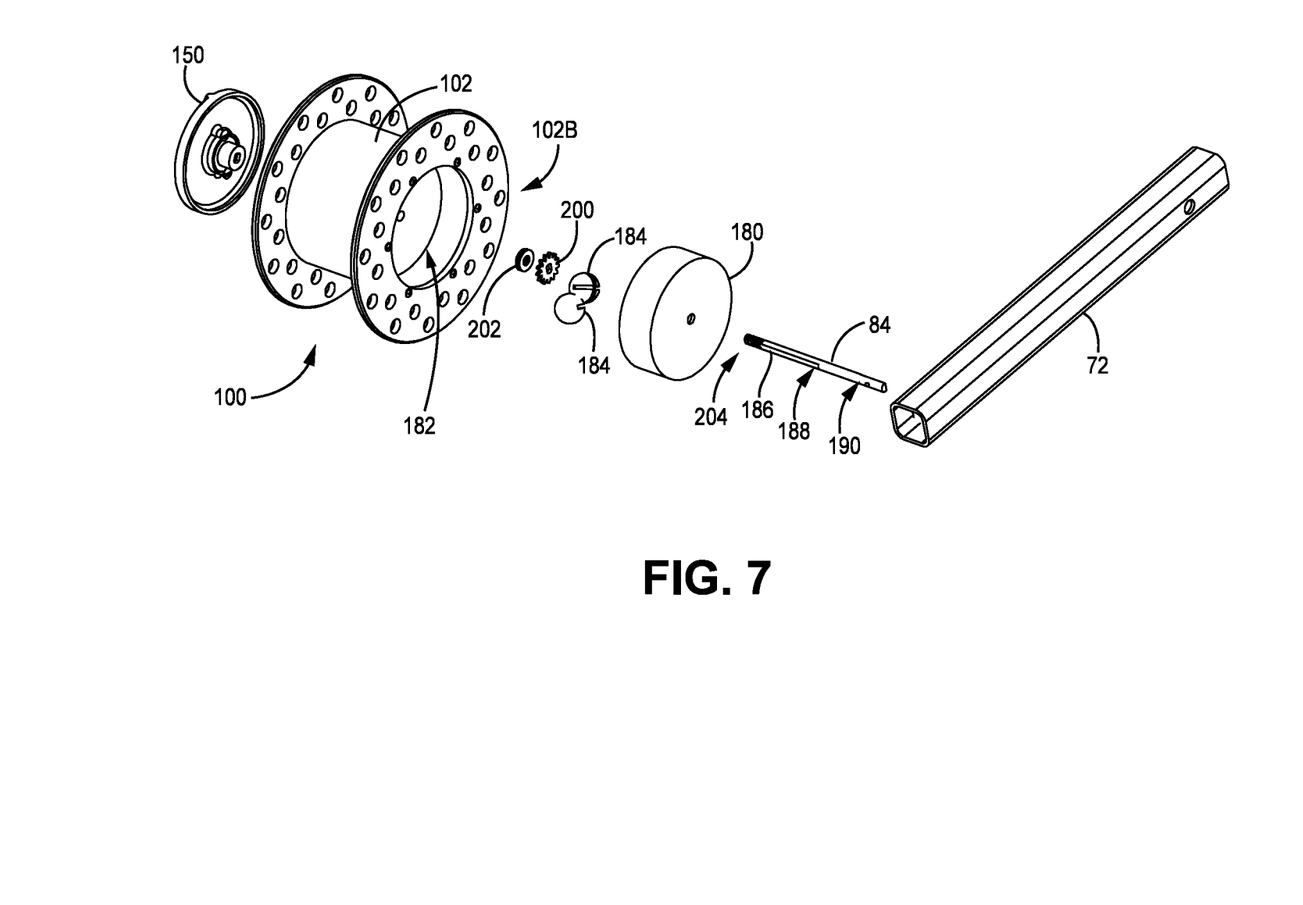
FIG. 7 is exploded view a drag knob assembly, spool assembly, and other components disposed on the main shaft 9 and coupled to a telescoping body of an arm assembly.

One exemplary mechanism that can be used to control the compressive force applied to the washer stack 120 is an adjustable knob assembly (also referred to as a "drag knob assembly") 150. As shown in the embodiment of FIG. 7, the knob assembly 150 can be attached to the reel 100 on the first side 102A of the spool body 102. FIGS. 6A and 6B depict front and back views of the knob 150. The knob 150 controls the drag force by allowing for either tightening the knob 150 on the main shaft 84 or loosening it, thereby either applying additional compression to the washer stack 120 or reducing it.

Figure 6C:
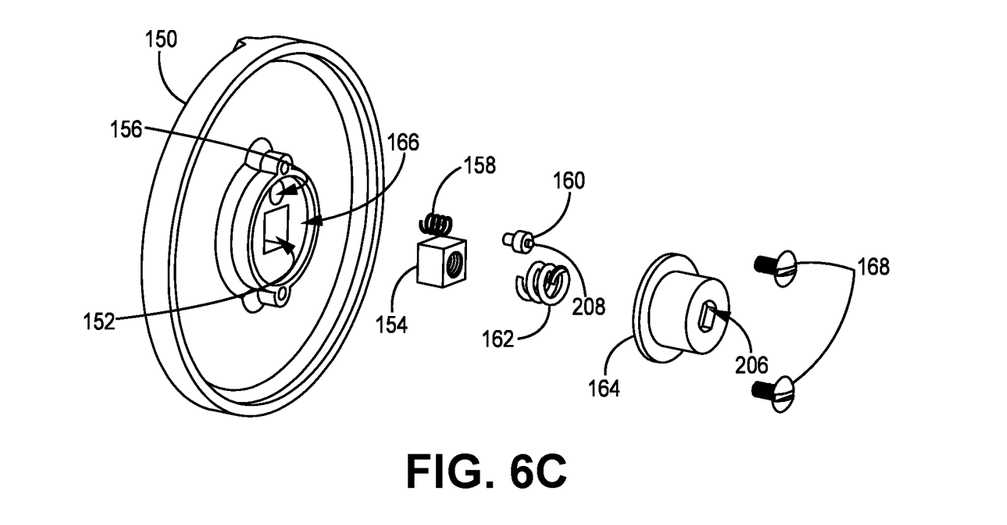
FIG. 6C is an exploded view of FIG. 6A depicting all of the components within the assembly.

FIG. 6C is an exploded view of the back view of the drag knob 150 of FIG. 6A, depicting all of the components within the assembly 150. As shown, the knob 150 has a square opening 152 defined with the knob 150 that receives the drag knob threaded nut 154. The nut 154 is restricted from rotating in relation to the drag knob 150 as a result of the square cutout 152, but can move laterally within the square opening 152. Adjacent to the square opening 152 in the drag knob 150 is a circular opening 156 as shown that is sized to receive the drag knob detent spring 158 and the drag knob detent 160.

Continuing with FIG. 6C, the drag knob 150 has a drag knob spring 162 that is disposed between the knob 150 and the drag knob spring housing 164, and more specifically is disposed within a cavity (not shown) defined in the drag knob spring housing 164. The spring housing 164 is positioned within the recess 166 defined in the knob 150 and attached thereto. In one embodiment, two retaining screws 168 are used to attach the drag knob spring housing 164 to the drag knob 150 and thereby retain the various components therein. More specifically, the retaining screws 168 are disposed within openings defined in the knob 150 as shown and attached thereto such that the heads of the screws 168 are positioned to retain the lip of the housing 164 within the recess while allowing the housing 164 to freely rotate in relation to the knob 150 within the recess. Alternatively, any known attachment mechanism can be used that can retain the housing 164 within the recess while allowing the housing 164 to rotate.

FIG. 7 is an exploded view of a telescoping body 72 and the various components of the reel 100 coupled thereto, according to one embodiment. The various reel 100 components as shown include implementations of the components described in detail above, including the spool body 102 and the drag knob 150 attached to the first side 102A thereof, both of which are positioned over the main shaft 84, which is attached to the telescoping body 72. In this embodiment, the reel assembly 100 also has a bell housing 180, which is disposed over the main shaft 84 and positioned within the recess 182 defined in the second side 102B of the spool body 102 such that the bell housing 180 is coupled to the spool body 102. The bell housing 180 contains two bells 184 disposed therein. When the reel 100 is fully assembled, the bells 184 are configured to be disposed loosely within the housing 180 such that the bells 184 tumble and make noise when fishing line is pulled off the spool body 102, thereby rotating the assembly 100 such that the housing 180 rotates. Alternatively, any noisemaking feature or mechanism can be used to indicate when the assembly 100 rotates.

As discussed above, the main shaft 84 has a cross-sectional profile along a specific length of the shaft 84 that has two flat surfaces or symmetrical faces 186 formed in each side of the shaft 84. According to one embodiment, the two flat surfaces 186 extend about halfway along the length of the main shaft 84 such that a shoulder/stop 188 is created where the end of the two flat surfaces 186 meets the standard circular cross-section 190. In one embodiment, a metal drag sprocket/washer 200 is disposed on the main shaft 84 and has an opening defined therein with two flat surfaces that match the flat surfaces of the shaft 84. As such, the metal drag sprocket/washer 200 is disposed on the shaft 84 along the length of the two flat surfaces of the shaft 84 such that the washer 200 is disposed against or adjacent to the shoulder on the main shaft 84 as described above and cannot rotate in relation to the main shaft 84. Alternatively, the main shaft 84 and/or the components coupled thereto can have any type of rotationally constraining mechanism or feature to rotationally constrain the appropriate components to the shaft 84.

In this implementation, a plastic drag washer 202 having an opening defined therein with two flat surfaces is also provided. The washer 202 can be disposed over the main shaft 84 and positioned against the metal drag sprocket/washer 200 such that the washer 202 does not rotate in relation to the main shaft 84. When the spool assembly 104 is properly positioned on the main shaft 84 and the bell housing 180 properly attached within the recess of the spool assembly 104, the plastic drag washer 202 will be in contact with the inner wall of the recess in the spool assembly 104.

As discussed above, the reel assembly 100 is disposed on the main shaft 84 such that the end of the main shaft 84 extends out of an opening in the spool body 102 on the first side 102A of the body 102 (the same side as the drag washer cavity 122 (as discussed above)). As such, the threads 204 at the end of the main shaft 84 are visible as the main shaft 84 extends from the first side 102A of the body 102. Further, the reel 100 is disposed on the main shaft 84 such that the flat surfaces of the openings of the metal drag washers 128 described above are correctly aligned with the flat surfaces on the main shaft 84.

In addition, the drag knob assembly 150 is disposed on and threadably attached to the threads 204 of the main shaft 84 extending from the reel 100 as discussed above. More specifically, the knob 150 is positioned such that the flat surfaces of the opening 206 defined in the drag knob spring housing 164 discussed above are aligned with the flat surfaces of the main shaft 84 and the main shaft 84 extends through the drag knob spring housing 164 and the drag knob spring 162, and the threads 204 of the shaft 84 are threadably coupled to the drag knob threaded nut 154. Thus, the drag knob assembly 150 is threadably attached to the main shaft 84 at the threads 204 such that the reel assembly 100 is disposed between the drag knob assembly 150 and the plastic drag washer 202, and the outermost face of the drag knob spring housing 164 is in contact with the outermost drag washer 128 in the drag washer stack 120. Further, as a result of its opening 206 having flat surfaces that match those on the shaft 84, the drag knob spring housing 164 is not rotatable in relation to the main shaft 84, while, in contrast, the drag knob 150 is rotatable. Thus, rotation of the drag knob assembly 150 in the clockwise direction causes the assembly 150 to be urged toward the telescoping body 72, thereby increasing the friction between the washers 126, 128, 130 and thus increasing the amount of drag. Further, rotation of the assembly 150 in the counterclockwise direction causes the assembly 150 to be urged away from the telescoping body 72, thereby reducing the friction between the washers 126, 128, 130 and thus decreasing the amount of drag.

According to one implementation, the drag knob detent 160 discussed above rotates about the face of the drag knob spring housing 164. The drag knob detent 160 has a nipple 208 that makes contact with and clicks in and out of dimples (not shown) cut into the drag knob spring housing 164 as the detent 160 rotates. This interaction between the nipple 208 and the dimples (not shown) creates an audible clicking noise that alerts a user that the drag knob 150 is being rotated and allows the user to determine how much the drag knob 150 is being rotated. Further, the interaction also adds resistance between the drag knob 150 and the drag knob spring housing 164 to prevent loosening of the drag knob assembly 150 off of the main shaft 84.

The drag knob 150 can control the friction generated between the drag knob spring housing 164, the drag washer stack 120, the spool body 102, and the plastic drag washer 202 by controlling the compressive force along the length of the main shaft 84. More specifically, the rotation of the drag knob 150 can tighten the drag knob threaded nut 154, thereby compressing the drag knob spring 162 between the drag knob threaded nut 154 and the drag knob threaded nut housing 164. The resulting force is transferred to the drag washer stack 120 such that the stack 120 is compressed between the drag knob assembly 150 and the spool body 102. The spool body 102 experiences further resistance between the face of the spool and the plastic drag washer 202.

The resulting drag system in the reel system embodiments herein is an improvement over existing drag systems. More specifically, the known drag systems used in the current rattle reel devices are simple and only allow for gross or macro adjustments to the drag force. These macro adjustments make it difficult for the user to balance the system with the proper amount of drag. If the system doesn't have enough drag, a small force from the bait and/or the weight of the line can pull out enough line to cause the lure to sink out of position or to the bottom of the body of water. In contrast, the reel embodiments herein have a drag system that provides micro adjustments, thereby making it easier for a user to control the exact amount of drag applied to the line in an effective manner. That is, the drag mechanism 120 as described above allows for micro-adjustments by rotating the knob 150 and thereby adjusting the amount of compression applied to the drag mechanism 120.

In certain embodiments, the various components of the reel and arm assembly embodiments herein can be made of plastic, aluminum, steel, or any combination thereof, which add to the robustness of the system.

More specifically, in certain embodiments, certain components of the arm assembly 20 (including, for example, the bracket 22, attachment body 24, two-way joint 30, pivoting insert 54, mounting block 80, and end cap 86) can be made of high density polyethylene ("HDPE"). Further, in some implementations, the HDPE can have an ultraviolet inhibitor incorporated therein to minimize any potential embrittlement resulting from exposure to sunlight. Alternatively, those components can be made of any similar material that does not become brittle in subzero temperatures and/or that is resistant to damage from exposure to sunlight.

Additionally, in some specific embodiments, certain components (including, for example, bolts 50, nuts 52, the telescoping body 72, the attachment mechanism 74, the main shaft 84, and the fastener screws 108) can be made of any stainless steel. Alternatively, those components can be made of any similar metal that resists corrosion.

In accordance with certain embodiments, certain other components (including, for example, the arm body 70 and the spool walls 104) can be made of aluminum or a similar metal. In certain implementations, these components can be machine extruded or pultruded. Further, according to some embodiments, the aluminum in these components is hard coat anodized to resist wear and friction. Alternatively, these components can be made of any similar material.

In addition, certain components according to some implementations (including, for example, the spool body 102, the adjustable knob assembly 150, the threaded nut 154, the detent 160, the spring housing 164, and the bell housing 180) can be made of a polycarbonate or any similar material with high dimensional stability to maintain tight tolerances.

In accordance with certain embodiments, the fabric washers 126 of the washer stack 120 can be made of carbon fiber cloth, Carbon TEX, or molded Delrin AF. In some embodiments, the material can have Teflon incorporated therein. Alternatively, the fabric washers 126 can be made of any similar material. Further, the metal washers 128 of the stack 120 can be made of any stainless steel, and can, in some embodiments, have a 2B finish or better.

The springs 132, 158, 162 can, in some implementations, be made of spring steel or any other known steel that can be used in such springs.

Although the various embodiments have been described with reference to preferred implementations, persons skilled in the art will recognize that changes may be made in form and detail without departing from the spirit and scope thereof.

What is claimed is:

1. A fishing reel system, the system comprising:
   (a) an arm assembly comprising:
      (i) an elongate arm body;
      (ii) an elongate extendable arm body slidably disposed within the elongate arm body;
      (iii) a two-way joint disposed at a proximal end of the elongate arm body; and
      (iv) an attachment mechanism coupled to the two-way joint;
   (b) a reel assembly comprising:
      (i) a spool body rotatably coupled to the elongate extendable arm body, wherein the spool body is configured to receive fishing line wrapped around the spool body;
      (ii) a drag washer stack operably coupled to the spool body such that compression of the drag washer stack adjustably creates a desired amount of drag in rotation of the spool body; and
      (iii) a drag adjustment mechanism operably coupled to the drag washer stack, wherein adjustment of the drag adjustment mechanism causes adjustment in the compression of the drag washer stack, thereby causing adjustment of the drag in the rotation of the spool body.

2. The fishing reel system of claim 1, wherein the two-way joint allows vertical and horizontal rotation, whereby the elongate arm body is moveable vertically and horizontally in relation to the attachment mechanism.

3. The fishing reel system of claim 1, wherein the attachment mechanism is configured to attach to a wall or other stationary object.

4. The fishing reel system of claim 1, further comprising an elongate shaft extending from the elongate extendable arm body, wherein the spool body is rotatably disposed over the elongate shaft.

5. The fishing reel system of claim 4, wherein the drag washer stack comprises at least two washers disposed on the elongate shaft.

6. The fishing reel system of claim 1, wherein the drag washer stack comprises at least one fabric washer and at least one metal washer.

7. A fishing reel system, the system comprising:
   (a) an arm assembly comprising:
      (i) an elongate arm body;
      (ii) an elongate extendable arm body slidably disposed within the elongate arm body;
      (iii) a two-way joint disposed at a proximal end of the elongate arm body;
      (iv) an attachment mechanism coupled to the two-way joint; and
      (v) an elongate shaft extending from the elongate extendable arm body;
   (b) a reel assembly comprising:
      (i) a spool body rotatably disposed on the elongate shaft, wherein the spool body is configured to receive fishing line wrapped around the spool body;
      (ii) a drag washer stack operably coupled to the spool body such that compression of the drag washer stack adjustably creates a desired amount of drag in rotation of the spool body, the drag washer stack comprising at least two washers disposed on the elongate shaft; and
      (iii) a drag adjustment mechanism operably coupled to the drag washer stack, wherein adjustment of the drag adjustment mechanism causes adjustment in the compression of the drag washer stack, thereby causing adjustment of the drag in the rotation of the spool body.

8. The fishing reel system of claim 7, wherein the spool body comprises a stack cavity defined within the spool body, wherein the drag washer stack is disposed within the stack cavity.

9. The fishing reel system of claim 8, wherein the stack cavity comprises at least one notch defined in an inner wall of the stack cavity.

10. The fishing reel system of claim 9, wherein a first washer of the at least two washers comprises a tab extending from the first washer, wherein the tab is mateable with the at least one notch.

11. The fishing reel system of claim 7, wherein the at least two washers comprises at least one fabric washer and at least one metal washer.

12. The fishing reel system of claim 7, wherein the at least two washers comprise:
   (a) at least one fabric washer;
   (b) at least one metal washer; and
   (c) a tabbed washer comprising a tab extending from the tabbed washer.

13. The fishing reel system of claim 7, wherein the at least two washers comprise:
   (a) at least two fabric washers;

(b) at least two metal washers; and
(c) a tabbed washer comprising a tab extending from the tabbed washer.

14. A fishing reel system, the system comprising:
(a) an arm assembly comprising:
  (i) an elongate arm body;
  (ii) an elongate extendable arm body slidably disposed within the elongate arm body;
  (iii) a two-way joint disposed at a proximal end of the elongate arm body;
  (iv) at least one attachment mechanism couplable to the two-way joint; and
  (v) an elongate shaft extending from the elongate extendable arm body;
(b) a reel assembly comprising:
  (i) a spool body comprising:
    (A) a lumen defined within the spool body, wherein the lumen extends from a first side to a second side of the spool body, wherein the elongate shaft is disposed within the lumen; and
    (B) a stack cavity defined within the first side of the spool body,
    wherein the spool body is configured to receive fishing line wrapped around the spool body;
  (ii) a drag washer stack disposed within the stack cavity such that compression of the drag washer stack adjustably creates a desired amount of drag in rotation of the spool body, the drag washer stack comprising at least one fabric washer and at least one metal washer disposed on the elongate shaft; and
  (iii) a drag adjustment mechanism disposed on the first side of the spool body, wherein adjustment of the drag adjustment mechanism causes adjustment in the compression of the drag washer stack, thereby causing adjustment of the drag in the rotation of the spool body.

15. The fishing reel system of claim 14, wherein the stack cavity comprises at least one notch defined in an inner wall of the stack cavity.

16. The fishing reel system of claim 15, wherein the drag washer stack further comprises a tabbed washer disposed on the elongate shaft, wherein the tabbed washer comprises a tab extending from the tabbed washer, wherein the tab is mateable with the at least one notch.

17. The fishing reel system of claim 16, wherein the at least one fabric washer comprises at least two fabric washers, and wherein the at least one metal washer comprises at least two metal washers.

18. The fishing reel system of claim 17, wherein each of the at least two fabric washers, the at least two metal washers, and the tabbed washer comprises a central opening defined therein, wherein the elongate shaft is disposed through the central opening.

19. The fishing reel system of claim 14, wherein the drag adjustment mechanism is operably coupled to the elongate shaft.

20. The fishing reel system of claim 19, wherein rotation of the drag adjustment mechanism in a clockwise direction increases friction between the at least one fabric washer and the at least one metal washer.

* * * * *